May 17, 1960 P. TASHMAN 2,936,899
TRAY OR PAN CABINETS
Filed Feb. 26, 1959 2 Sheets-Sheet 1
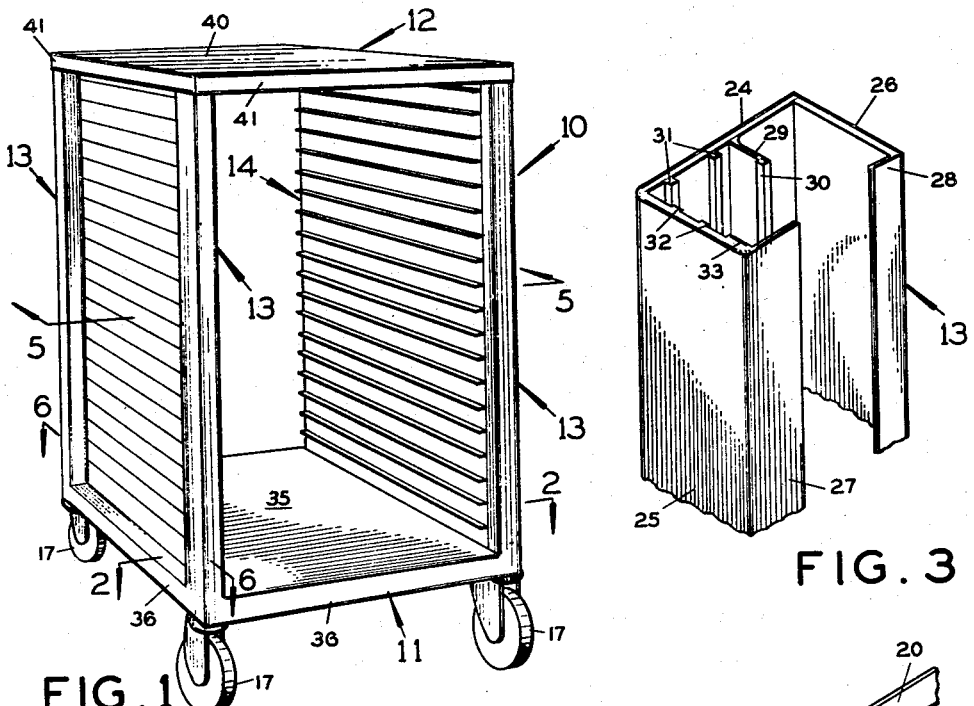
FIG. 1
FIG. 3
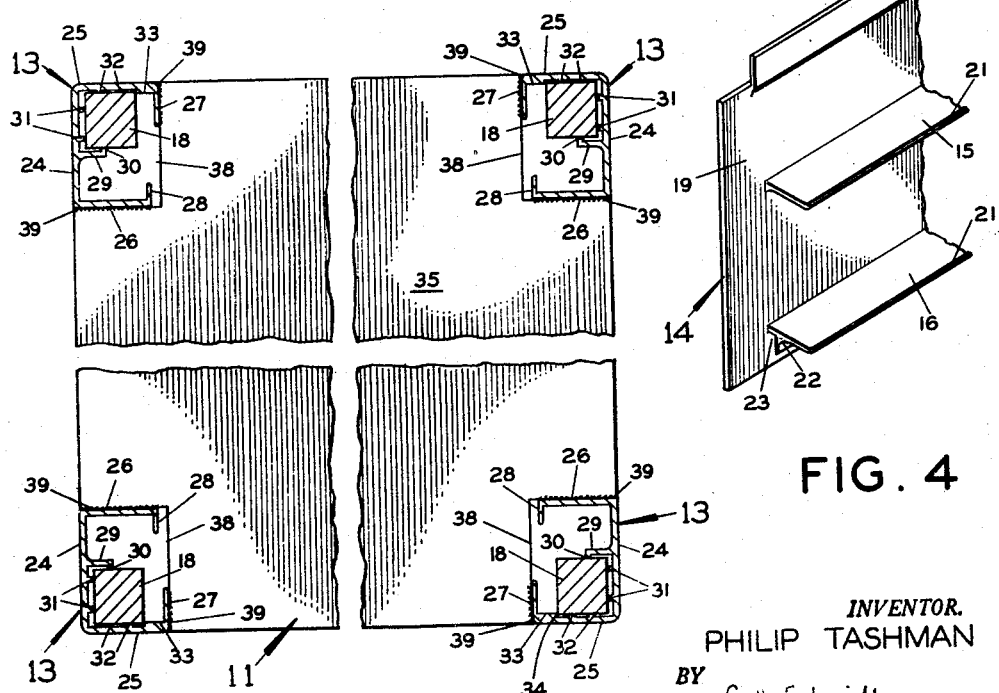
FIG. 2
FIG. 4
INVENTOR.
PHILIP TASHMAN
BY E. H. Schmidt
ATTORNEY May 17, 1960   P. TASHMAN   2,936,899
TRAY OR PAN CABINETS
Filed Feb. 26, 1959   2 Sheets-Sheet 2
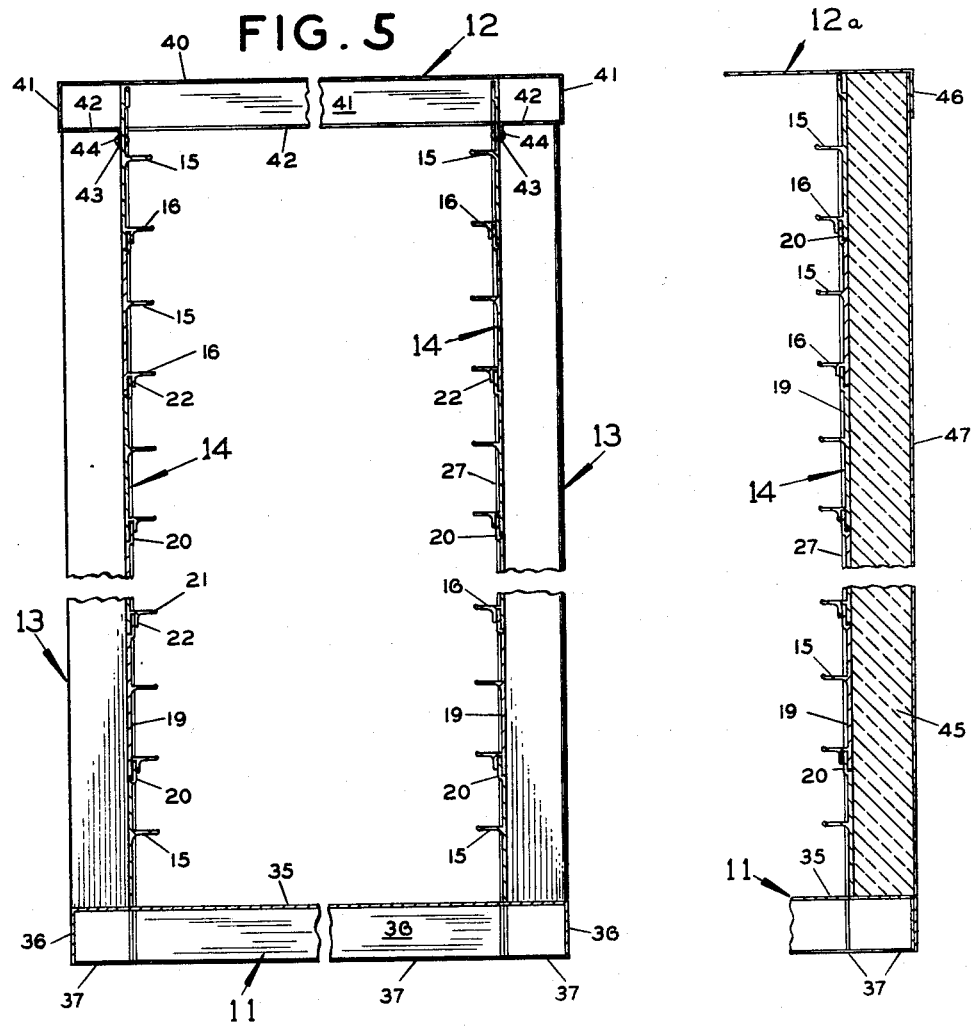
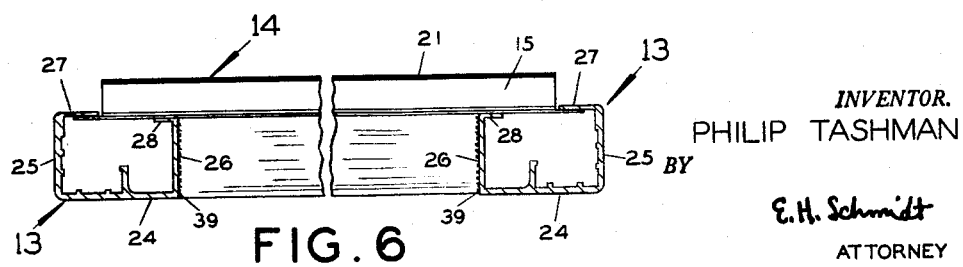
INVENTOR.
PHILIP TASHMAN
BY
E. H. Schmidt
ATTORNEY

United States Patent Office 2,936,899
Patented May 17, 1960

2,936,899

TRAY OR PAN CABINETS

Philip Tashman, Coral Gables, Fla.

Application February 26, 1959, Serial No. 795,742

8 Claims. (Cl. 211—71)

This invention relates to food holding cabinets and is directed particularly to improvements in cabinets of the type having a plurality of pairs of opposed horizontal ledge slides on which trays or pans can be slidingly supported for temporarily storing food in cafeterias, restaurants, hospitals, bakeries, etc.

One object of the invention is to provide a cabinet of the character described wherein the ledge slides are integrally formed with a portion of the side wall by extrusion to form a wall section, and wherein the wall sections are formed with interlocking means along their lengths allowing any desired number of wall sections to be assembled in the vertical direction, whereby the manufacture of cabinets of various heights is facilitated.

Still another object of the invention is to provide a cabinet as described above which includes extruded box beam corner posts having means for slidingly inserting the ends of the wall sections in locking interrelation with each other and with the corner posts, whereby extremely great strength and rigidity is achieved.

Other objects are to provide a cabinet structure of the character described which will be devoid of cracks along the slide ledges to permit easy cleaning, and which will be compact in structure, economical to manufacture, attractive in appearance and durable in use.

Still further objects, features and advantages of the invention will be apparent from the following description when read with reference to the accompanying drawings. In the drawings:

Fig. 1 is a perspective view of a tray or pan cabinet embodying the invention,

Fig. 2 is a horizontal cross-sectional view, with portions broken away and with wall sections omitted, of the cabinet shown in Fig. 1, taken along the line 2—2 thereof in the direction of the arrows, Fig. 3 is a perspective view of a short length of the extrusion forming the corner posts of the cabinet, Fig. 4 is a perspective view of an end portion of one of the extruded wall section members, Fig. 5 is a vertical cross-sectional view of the cabinet, with portions broken away, taken along the line 5—5 of Fig. 1 in the direction of the arrows, Fig. 6 is a horizontal cross-sectional view of one side of the cabinet taken along the line 6—6 of Fig. 1 in the direction of the arrows, and Fig. 7 is a sectional view similar to Fig. 5, but showing one side only, of a modification of the invention wherein the side walls are insulated in adapting the cabinet for cold or hot food storage.

Referring now in detail to the drawings, wherein like reference numerals denote corresponding parts throughout the several views, 10 in Fig. 1 designates the improved tray or pan cabinet generally, the same comprising rectangular bottom and top wall members 11 and 12, respectively, preferably formed of heavy gauge sheet aluminum alloy. The bottom and top wall members 11 and 12 are secured in spaced parallel relation by box beam corner post members 13, formed of extruded aluminum alloy as hereinbelow more particularly described for interlocking assembly with the ends a plurality of wall sections 14 at each side of the cabinet. The wall sections 14 comprise means for interlocking one above the other between the side pairs of corner post members 13 in any number according to the desired height of cabinet. The wall sections 14 are also extruded, preferably of aluminum alloy, and are formed along their lengths with upper and lower ledge slides 15 and 16, respectively, opposed ones of which in the cabinet 10 serve for slidingly receiving and supporting the opposite side edges of a food pan or tray. To facilitate moving the cabinet from place to place it is preferably fitted at each bottom corner with a castor 17, means hereinbelow described being provided in the corner post members 13 for receiving the square shanks 18 of said castors.

As is most clearly shown in Fig. 4, the extruded wall sections 14 are formed with a flat, rectangular wall member 19 the upper edge portion of which is inwardly offset as indicated at 20. The upper and lower slide ledges 15 and 16, respectively, project inwardly at right angles and are each formed along their outer ends with a short, rounded, turned-up lip 21. The lower slide ledge 16 is formed along its underside with a downwardly-extending wall portion 22 the inside of which provides a flat, vertical surface in spaced parallel relation to the inner surface of the wall member 19, and defines therewith a longitudinal rectangular groove 23 open at the bottom, of such size as to receive therein in closely-fitting relation the inwardly-offset upper edge portion 20 of another wall section 14 arranged directly below in the assembly of the cabinet walls, as is hereinbelow more particularly described.

The extruded corner post members 13, preferably of aluminum alloy, are, as best illustrated in Figs. 2, 3 and 6, generally in the form of a box beam, and comprise a side wall 24 integrally formed at each end with a pair of opposed, parallel side walls 25, 26, the side wall 26 being of somewhat lesser width than the side wall 25. The outer end of the side wall 25 is integrally formed with an inwardly-extending, right-angular wall portion 27, parallel to the side wall 24. The outer end of the side wall 26 is integrally formed with an inwardly-extending right-angular wall portion 28, of lesser width than the wall portion 27, parallel to the side wall 24 and parallel to and inwardly off-set from the side wall portion 27.

As described above, means is provided in the extruded corner post members 13 for receiving endwise in close fitting relation therein the square shanks 18 of the castors 17. To this end the corner post members 13 are extruded with a right-angular, longitudinal rib 29 extending inwardly from the side wall 24 and terminating in a short, longitudinal shoulder portion 30 facing the interior of the side wall 25. The side wall 24 is formed along its inside between the rib 29 and the side wall 25 with a pair of short, longitudinally-extending spacer ribs 31. The side wall 25 is similarly formed with a pair of short, interior, longitudinally-extending spacer ribs 32, and has an end portion 33 of increased thickness providing a shoulder 34 of somewhat greater height than the ribs 32. As best illustrated in Fig. 2, the interior rib 29, the spacer ribs 31 and 32 and the shoulder 34 provided in the extruded corner post members 13 define a square opening of such size as to slidingly receive and frictionally hold therein the square shank 18 of the castors 17.

As illustrated in Figs. 2 and 5, the bottom wall member 11 is fabricated of sheet metal and comprises a rectangular top portion 35 and downwardly-bent side portions 36 the ends of which are bent inwardly, as indicated at 37, to provide a smooth, rigid, box-like structure. The four corners of the bottom wall member 11 are cut to provide rectangular recesses 38 of such size as to receive therein the lower ends of the corner post members 13, the outer surfaces of the side walls 24 and 25 thereof being substantially flush with the side portions 36 of said bottom wall member. The corner post members 13 are rigidly secured to the bottom wall member 11 by welding, as indicated at 39 in Fig. 2.

Before the wall sections 14 are assembled in place to form the side walls of the cabinet 10, end portions of the upper off-set edge portion 20 and the upper and lower slide ledges 15, 16 are cut away (see Fig. 4) to allow the ends of the wall members 19 of said wall sections to freely slide behind the opposed wall portions 27 of the corner post members 13 at each side of the cabinet (see Fig. 6). The side wall sections 14 will thus be locked against sideward movement by the inner and outer surfaces of the off-set wall portions 27, 28, respectively, and against endwise movement by abutment against the ends of the side wall portions 25. As illustrated in Figs. 5 and 7, as each successive wall section 14 is assembled in place, its rectangular groove 23 will receive the upper off-set edge portion 20 of the wall section immediately below, to provide a strong interlocking assembly devoid of cracks.

The top wall member 12 is assembled last, and comprises a rectangular top portion 40, downwardly-bent side portions 41, and inwardly-bent underside portions 42. As best illustrated in Fig. 5, the underside portions 42 at each side of the cabinet 10 terminate in short, downwardly-extending portions 43 adapted to fit against the outer surfaces of the uppermost wall sections 14 and to be secured therealong as by a plurality of rivets 44 to securely hold the wall sections 14 against upward movement. The underside portions 42 are cut at each corner to provide rectangular openings for receiving the upper ends of the corner post members 13, which are welded in place therein and against the insides of the side portions 41. As illustrated in Fig. 5, the lower slide ledges 16 of the lowermost wall sections 14 in the cabinet 10 are preferably cut away, their being insufficient space below for their use in holding a tray or pan.

Fig. 7 illustrates a modification of the invention showing how the side walls could readily be converted into a cavity wall structure containing a layer of insulation 45 for insulating the interior of the cabinet against cold or heat. In this example the top wall member 12a is formed with a downwardly-extending side wall portions 46 overlying and welded to the upper end of an outer wall panel 47 welded between the corner post members at each side. It will of course be understood that in this modification of the cabinet, there will also be provided an insulated rear wall and a front wall having an insulated door, the particular details of which form no part of the present invention.

Obviously many modifications and variations of the invention are possible in the light of the above teachings. It is therefore to be understood that within the scope of the appended claims, the invention can be practised otherwise than as specifically described.

What is claimed as new and for which it is desired to secure Letters Patent is:

1. In a tray or pan cabinet, the combination comprising, a rectangular top wall member, a rectangular bottom wall member, a pair of elongated post members secured to and extending vertically between the corners of said top wall member and said bottom wall member at each side thereof for holding said wall members in spaced parallel relation and defining a box-like enclosure, a plurality of thin flat side wall section members, means in each pair of side post members for slidingly receiving and constraining to movement in the longitudinal direction of and between said side post members at each side, end portions of said side wall section members in serial disposition, and longitudinally-extending slide ledges formed along said side wall section members and facing inwardly of said box-like structure for slidingly supporting trays or pans in the cabinet.

2. The tray or pan cabinet as defined in claim 1 wherein said side post members are of extruded metal in the form of a box column open at one side, and wherein said open side is formed with opposed inwardly-extending parallel side portions off-set from each other by an amount substantially equal to the thickness of said side wall sections to constitute said means for slidingly receiving the end portions of said side wall section members.

3. In a tray or pan cabinet, the combination comprising, a rectangular top wall member, a rectangular bottom wall member, a pair of elongated post members secured to and extending vertically between the corners of said top wall members and said bottom wall member at each side thereof for holding said wall members in spaced parallel relation and defining a box-like enclosure, a plurality of flat side wall section members, means in each pair of side post members for slidingly receiving and constraining to movement in the longitudinal direction of and between said side post members at each side, end portions of said side wall section members in serial disposition, means on said side wall sections and integrally formed therewith overlapping contiguous edge portions in a series to eliminate cracks therebetween, and longitudinally-extending slide ledges formed along said side wall section members and facing inwardly of said box-like structure for slidingly supporting trays or pans in the cabinet.

4. The tray or pan cabinet as defined in claim 3 wherein said side post members are of extruded metal in the form of a box column open at one side, and wherein said open side is formed with opposed inwardly-extending parallel side portions off-set from each other by an amount substantially equal to the thickness of said side wall sections to constitute said means for slidingly receiving the end portions of said side wall section members.

5. The tray or pan cabinet as defined in claim 3 wherein said overlapping means on said side wall sections comprises an inwardly-offset marginal edge portion along one longitudinal side of each of said side wall sections, and a complementary longitudinal groove formed along the inside of the other longitudinal side of each of said side wall sections adapted to receive the off-set marginal edge portion of a contiguous side wall section at one side or the other of the cabinet.

6. The tray or pan cabinet as defined in claim 5 wherein said side wall sections are formed of extruded metal, and comprise a parallel pair of said slide ledges, the underside of one of said pair of slide ledges being provided with a downwardly-projecting portion defining an inner wall portion of said groove.

7. In an extruded side wall section construction for cabinet walls, the combination comprising, a thin, flat elongated wall member, an inwardly-offset marginal edge portion formed along one longitudinal side of said wall member, a slide ledge formed longitudinally along the inner face of said side wall member near the other longitudinal side of said wall member, the underside of said slide ledge being provided with a downwardly-projecting portion defining together with the inner face of said side wall member along the other longitudinal side of said wall member a longitudinal groove complementary with said inwardly-offset marginal edge portion.

8. An extruded side wall section construction for cabinet walls as defined in claim 7 including a second slide ledge formed longitudinally along the inner face of said side wall member in spaced parallel relation with respect to said first-mentioned slide ledge.

References Cited in the file of this patent

UNITED STATES PATENTS

| | | |
|---|---|---|
| 1,083,850 | Morrison | Jan. 6, 1914 |
| 2,294,625 | Mori | Sept. 1, 1942 |
| 2,580,153 | Birkic | Dec. 25, 1951 |
| 2,745,523 | Biggs | May 15, 1956 |
| 2,897,930 | Primich | Aug. 4, 1959 |